(12) United States Patent
Hui et al.

(10) Patent No.: US 11,841,872 B2
(45) Date of Patent: Dec. 12, 2023

(54) INTERACTIVELY BUILDING PREVIEWS OF EXTRACT, TRANSFORM, LOAD (ETL) GRAPHS USING CACHED PREVIEWS OF SUBGRAPHS

(71) Applicant: Salesforce.com, Inc., San Francisco, CA (US)

(72) Inventors: Gregory Hui, San Francisco, CA (US); Alex Field, Vancouver (CA); Brittany Zenger, Vancouver (CA); Magnus Byne, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 221 days.

(21) Appl. No.: 17/385,393

(22) Filed: Jul. 26, 2021

(65) Prior Publication Data
US 2023/0023655 A1    Jan. 26, 2023

(51) Int. Cl.
*G06F 16/25* (2019.01)
*G06F 3/0486* (2013.01)
(Continued)

(52) U.S. Cl.
CPC .......... *G06F 16/254* (2019.01); *G06F 3/0486* (2013.01); *G06F 16/24552* (2019.01); *G06F 16/26* (2019.01)

(58) Field of Classification Search
CPC .............. G06F 16/254; G06F 3/0486; G06F 16/24552; G06F 16/26; G06F 3/04817; G06F 3/04845; G06F 8/34; G06F 16/9024
See application file for complete search history.

(56) References Cited

U.S. PATENT DOCUMENTS 5,423,040 A * 6/1995 Epstein ................... G06F 8/311
                                                           718/102
10,831,757 B2   11/2020 Petschulat et al.
(Continued)

FOREIGN PATENT DOCUMENTS

WO    2018075817 A1    4/2018

*Primary Examiner* — Andrey Belousov
(74) *Attorney, Agent, or Firm* — Kwan & Olynick LLP

(57) ABSTRACT

Disclosed are some implementations of systems, apparatus, methods and computer program products for executing a process flow represented by a graph or portion thereof using cached subgraphs. A first request to execute a first portion of a process flow is processed, where the first portion of the process flow is represented by a first subgraph of a graph representing the process flow and a final node of the first subgraph corresponds to a set of computer-readable instructions. The first portion of the process flow is executed such that a first output of executing the first portion of the process flow is obtained. The first subgraph is stored in association with the first output in a first cache entry of a cache. A second request to execute a second portion of the process flow is processed, where the second portion of the process flow is represented by a second subgraph of the graph. At least one cache entry for which a corresponding subgraph matches at least a portion of the second subgraph is identified in the cache, where the at least one cache entry includes the first cache entry. The first output is retrieved from the first cache entry, a node of the second subgraph to which the final node of the first subgraph is connected is identified, and the second portion of the process flow is executed by providing the first output as input to the identified node of the second subgraph without executing the set of computer-readable instructions.

20 Claims, 16 Drawing Sheets

(51) Int. Cl.
    *G06F 16/2455*    (2019.01)
    *G06F 16/26*      (2019.01)

(56) References Cited

U.S. PATENT DOCUMENTS

| | | |
|---|---|---|
| 10,853,358 B2 | 12/2020 | Gitelman et al. |
| 2005/0144503 A1* | 6/2005 | Amarnath .............. G06Q 10/10 |
| | | 714/4.4 |
| 2008/0172674 A1* | 7/2008 | Yee ....................... G06F 16/254 |
| | | 718/106 |
| 2019/0036197 A1 | 1/2019 | Renilson et al. |
| 2019/0243824 A1 | 8/2019 | Gitelman et al. |
| 2021/0132777 A1 | 5/2021 | Zenger et al. |
| 2021/0279043 A1* | 9/2021 | Egenolf .................... G06F 8/34 |
| 2023/0017127 A1* | 1/2023 | Karpstein ............. G06F 9/4881 |

\* cited by examiner

INTERACTIVELY BUILDING PREVIEWS OF EXTRACT, TRANSFORM, LOAD (ETL) GRAPHS USING CACHED PREVIEWS OF SUBGRAPHS

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with executing process flows. More specifically, this patent document discloses techniques for generating execution previews of graphs representing process flows using cached previews of subgraphs of the graphs.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, electronic mail (email) systems, instant messaging systems, and other software applications in a cloud computing environment.

Existing design tools provide the ability to design a layout representing a process flow. A layout representing a process flow may also be referred to as a graph. Often, these tools enable a user to manually manipulate items and associated connectors within the layout via a drag and drop process.

A process flow corresponding to a layout includes computer-readable instructions corresponding to items in the layout. During execution of the process flow, the computer-readable instructions are generally executed in the order indicated by the connectors in the layout.

BRIEF DESCRIPTION OF THE DRAWINGS

The included drawings are for illustrative purposes and serve only to provide examples of possible structures and operations for the disclosed systems, apparatus, methods and computer program products for generating previews of graphs representing process flows using cached previews of subgraphs of the graphs. These drawings in no way limit any changes in form and detail that may be made by one skilled in the art without departing from the spirit and scope of the disclosed implementations.

DETAILED DESCRIPTION

Figure 1:
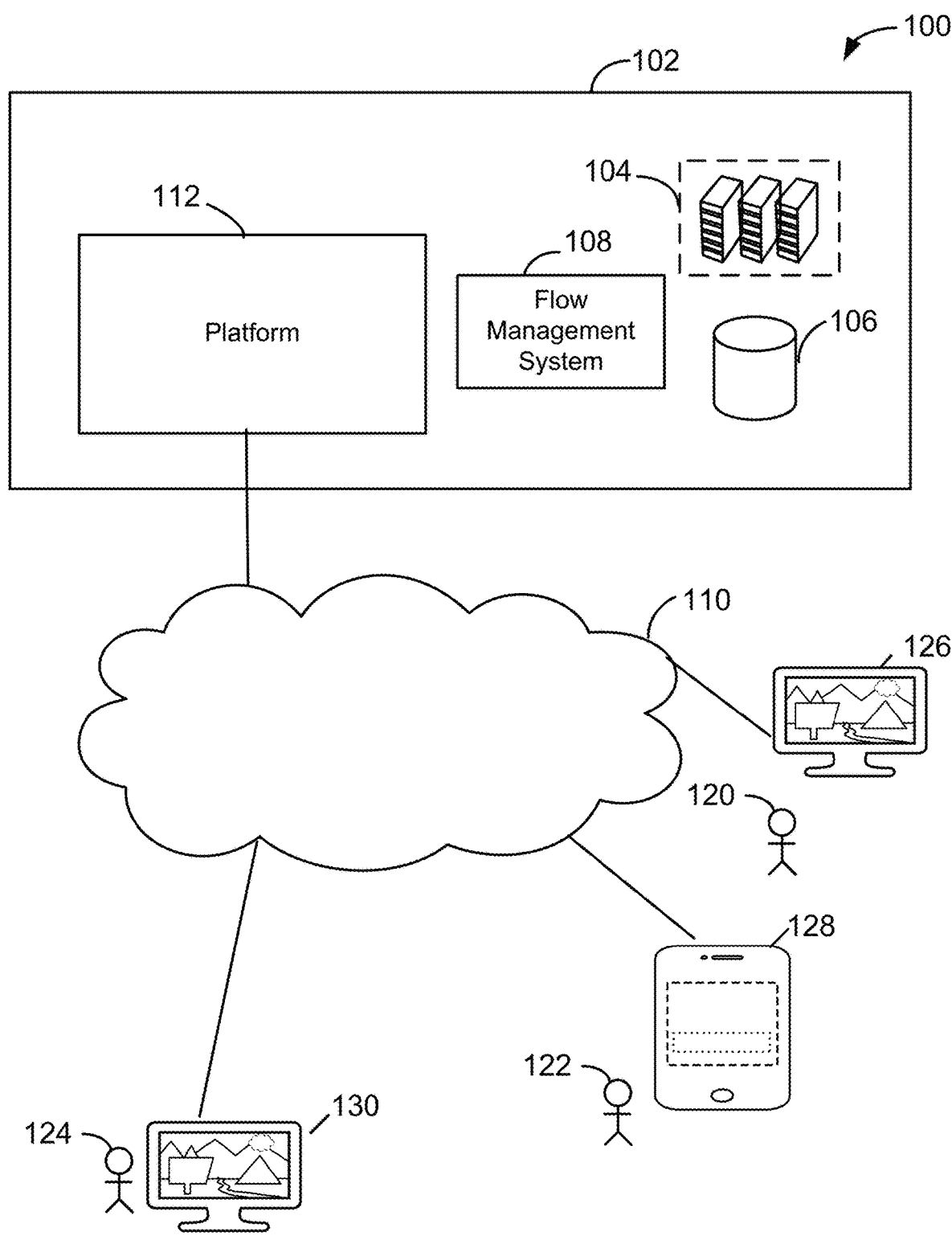
FIG. 1 shows a system diagram of an example of a system 100 in which previews of graphs may be generated, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured to generate previews of graphs representing process flows using cached previews of subgraphs of the graphs. In some implementations, the systems, apparatus, methods, and computer program products are configured to generate previews of graphs representing process flows responsive to user interaction with items represented in the graphs.

A process flow may be designed through the generation of a graph that visually represents the process flow. An element represented in the graph may correspond to a set of computer-readable instructions. Elements represented within the graph may be represented as nodes within the graph and may be "connected" to one another within the layout through the use of connectors. A node corresponding to an element may be represented by a graphical user interface element such as, for example, an icon representing an element type of a corresponding element. Such a representation may be configured to enable a user to interact with (e.g., select) a corresponding element within the graph. Through such an interaction, the user can request a preview of the process flow or portion thereof, where the process flow or portion thereof has an endpoint designated by the selected element.

To design a graph representing a process flow, a user typically accesses a layout design tool. Generally, the design tool presents a set of user-selectable options that enable element types to be selected by a user to add representations of corresponding elements to a graph. Upon selection, the user can drag and drag-and-drop representations of elements of selected element types to the desired positions in the graph.

In some implementations, a graph includes an extract transform load (ETL) graph representing an ETL process that extracts data from one or more data sources, transforms the data, and loads the transformed data into a destination system. For example, a destination system can include a database. A data source can include, for example, a database, file, or spreadsheet. Transformation of data can include transformation of the data to a different format or structure. The transformed data or portion thereof can be accessed by a software application that queries the destination system for further processing. In some instances, processing of the transformed data includes analysis and/or presentation to an end user.

In some implementations, the data includes customer data or is derived from customer data. Customer data can include, for example, contacts, leads, cases, or other customer-related data. For example, data pertaining to a case such as a customer support case may be stored in a corresponding database record of a database system. Often, organizations leverage Customer Relationship Management (CRM) systems to facilitate the management of customer data that may be received or derived from various channels such as telephone, email, live chat, marketing materials, and social media.

In some implementations, a process flow management system is configured to generate a "preview" of a graph (e.g., an ETL graph) representing a process flow or subgraph thereof in response to a user request submitted by a user such as a process flow design engineer. Stated another way, the system can execute the process flow or portion thereof to generate an interactive "preview" that includes results of execution. For example, results of execution (e.g., transformed data) can be provided for display by a client device, enabling a user to view the results of execution up to the selected point within the process flow.

In some implementations, a user can interact with a representation of an element (e.g., icon) within a graph to request a preview of the subgraph (or graph) having an endpoint represented by the element selected by the user. For example, a user may request a preview by clicking on the representation of the element. Responsive to processing the request, the system can generate a preview of the corresponding graph or subgraph. Such previews can be particularly useful to a user responsible for process flow design or testing since the results of data transformation can be viewed at various points during execution of the process flow.

During the process flow design or associated testing, a user can click on multiple nodes within the graph. In some instances, a graph or subgraph may be selected by the user more than once. In other instances, the user may select a subgraph of a larger subgraph or graph of that previously selected. While it is possible to cache results for a specific subgraph, the cached results cannot easily be applied to a subsequently selected graph or subgraph that differs from that subgraph.

Typically, when a user clicks on a node or representation in a graph representing a process flow such as an ETL flow, the process flow is executed up to that point in the flow, resulting in re-execution of portions of the process flow as the user clicks on multiple nodes within the graph. Due to these inefficiencies, significant processing resources are consumed. Such inefficiencies are multiplied as users design and test various process flows via the system.

In accordance with various implementations, results of execution of a portion of a process flow are cached in association with a selected subgraph of the corresponding graph representing the process flow. In the event that a subsequently selected subgraph of the graph contains the previously selected subgraph identified in the cache, the system can apply the previously cached results instead of re-executing computer-readable instructions of the portion of the process flow. In many instances, execution of the portion of process flow for which an output/preview result has been cached can be skipped. Therefore, results of execution of the subsequently selected subgraph (or graph) may be provided while avoiding re-execution of portions of the process flow.

In some implementations, execution results associated with a process flow or portion thereof are stored in association with a corresponding graph or subgraph for which a preview is selected. More particularly, a first request to execute a first portion of a process flow is processed, where the first portion of the process flow is represented by a first subgraph of a graph representing the process flow and the first request is received from a client device, where a final node of the first subgraph corresponds to a set of computer-readable instructions. The first portion of the process flow is executed such that a first output of executing the first portion of the process flow is obtained, and the first output is stored in association with the first subgraph in a first cache entry of a cache.

In some implementations, execution results stored in association with a corresponding graph or subgraph can be retrieved and applied to generate execution results for a subsequent requested preview. Specifically, a second request to execute a second portion of the process flow is processed, where the second portion of the process flow is represented by a second subgraph of the graph and the second request is received from the client device. At least one cache entry for which a corresponding subgraph matches at least a portion of the second subgraph is identified from the cache, where the at least one cache entry includes the first cache entry. The first output is retrieved from the first cache entry and a node of the second subgraph to which the final node of the first subgraph is connected is identified. The second portion of the process flow is executed by providing the first output as input to the identified node of the second subgraph without executing the set of computer-readable instructions.

In some implementations, intermediate results for intermediate node(s) of a subgraph (or graph) for which a preview is requested can be stored in association with corresponding segment(s) of the subgraph (or graph). Various heuristics for identifying intermediate nodes of a subgraph for which to store intermediate results include identifying intermediate nodes having greater than a threshold number of input paths and/or output paths.

Implementations are described with reference to subgraphs of a graph representing a process flow. A subgraph can include one or more nodes, which may be interconnected by one or more connectors. In some instances, a subgraph may include only a subset of all nodes present in the graph. In other instances, a subgraph may include all nodes present in the graph. Therefore, the term "subgraph" may refer to at least a portion of a graph representing a process flow.

FIG. 1 shows a diagram of an example of a system 100 in which a flow management system is implemented, in accordance with some implementations. Database system 102 includes a variety of different hardware and/or software components that are in communication with each other. In the non-limiting example of FIG. 1, system 102 includes any number of computing devices such as servers 104. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can also store user profiles, graphs (e.g., layouts), process flows, and/or database records such as customer relationship management (CRM) records.

System 102 includes flow management system 108. Flow management system 108 can facilitate the design and testing of process flows. More particularly, flow management system 108 can facilitate the generation of graphs representing process flows and/or associated "previews," as described herein. In the following description, a layout tool via which previews may be generated will be referred to as a "flow builder."

As will be described in further detail below, flow management system 108 is configured to facilitate the building of interactive previews for a graph representing a process flow responsive to requests for the interactive previews. An interactive preview can include both the execution of the process flow or portion thereof and providing results of the execution responsive to a request for an interactive preview. A user can request an interactive preview by clicking on a node within the graph, causing system 102 to generate a preview for a portion of the process flow up to an endpoint corresponding to the user-selected node.

In some implementations, system 102 is configured to store user profiles/user accounts associated with users of system 102. Information maintained in a user profile of a user can include a client identifier such an Internet Protocol (IP) address or Media Access Control (MAC) address. In addition, the information can include a unique user identifier such as an alpha-numerical identifier, the user's name, a user email address, and credentials of the user. Credentials of the user can include a username and password. The information can further include job related information such as a job title, role, group, department, organization, and/or experience level, as well as any associated permissions. Profile information such as job related information and any associated permissions can be applied by flow management system 108 to manage access to graphs and/or associated process flows.

In some implementations, information in a user profile may be used to determine the process flow types that are user-selectable by a user. For example, a Sales group within an organization may have access to a corresponding set of process flow types, which may pertain to sales process flows. As another example, a Marketing group within the organization may have access to a corresponding set of process flow types. Therefore, different groups within an organization may have access to different process flows and/or associated graphs.

Client devices 126, 128, 130 may be in communication with system 102 via network 110. More particularly, client devices 126, 128, 130 may communicate with servers 104 via network 110. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, employee users 120, 122, 124 of client computing devices 126, 128, 130 have accounts at salesforce.com®. By logging into their accounts, users 126, 128, 130 can access the various services and data provided by system 102 to employees. In other implementations, users 120, 122, 124 need not be employees of salesforce.com® or log into accounts to access services and data provided by system 102. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services provided by system 102 via platform 112 or an application installed on client devices 126, 128, 130. More particularly, client devices 126, 128, 130 can log into system 102 via an application programming interface (API) or via a graphical user interface (GUI) using credentials of corresponding users 120, 122, 124 respectively.

In some instances, a user may be a software developer, manager, system administrator, or other individual. A user may access flow management system 108 to design or update a graph representing a process flow and/or to perform associated testing through requesting interactive previews. A process flow can include a plurality of elements. A process flow element may correspond to a set of computer-readable instructions, which may be generated or modified by user(s) of the database system.

Client devices 126, 128, 130 can communicate with system 102 to access a flow builder of flow management system 108, which may facilitate the generation or updating of a layout (e.g., graph) and/or generation of interactive previews, as will be described in further detail below. Communications between client devices 126, 128, 130 and system 102 can be initiated by a user 120, 122, 124. Alternatively, communications can be initiated by system 102 and/or application(s) installed on client devices 126, 128, 130. Therefore, communications between client devices 126, 128, 130 and system 102 can be initiated automatically or responsive to a user request.

Some implementations may be described in the general context of computing system executable instructions, such as program modules, being executed by a computer. The disclosed implementations may further include objects, data structures, and/or metadata, which may facilitate execution of a process flow or may be generated as a result of execution of a process flow. Those skilled in the art can design or generate computer-executable instructions, which can be embodied on any form of computing machine program product.

Some implementations may also be practiced in distributed computing environments where tasks are performed by remote processing devices that are linked through a communications network. In a distributed computing environment, program modules may be located in local and/or remote computer storage media including memory storage devices.

Figure 2:
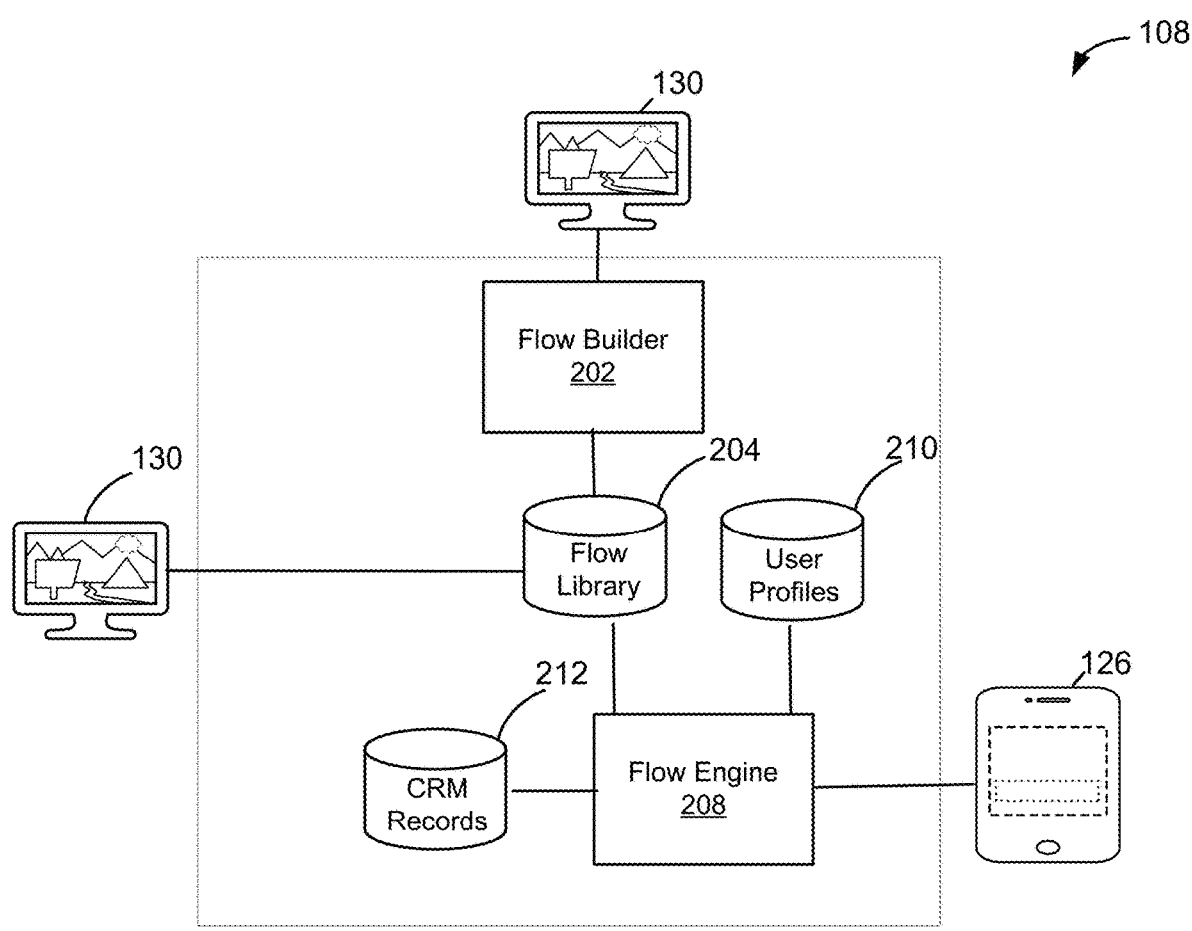
FIG. 2 shows a system diagram of an example of a flow management system 108, in accordance with some implementations

FIG. 2 shows a system diagram of an example of a flow management system 108, in accordance with some implementations. Flow management system 108 can include a flow builder 202 that enables a flow to be generated using existing flows and/or other components. For example, an administrator, software developer, or other user may access flow builder 202 via computing device 130 to generate a layout (e.g., graph) representing a flow including a plurality of elements.

In some implementations, a user may log into their account within system 102 via computing device 130. The user may then access an application configured to implement flow builder 202. Through flow builder 202, the user may generate a layout representing a process flow.

Flow builder 202 may present a "canvas" on which a layout may be generated or modified. The user may access a previously stored layout or may create a layout from a blank canvas. Each layout may correspond to a process flow identified by a corresponding flow name/identifier.

The user may select an element type from the user interface and perform a drag-and-drop operation to position an icon or other representation of the element type within a layout. Flow builder 202 may process an indication of the position, within the layout, at which a representation of an element of the element type is to be positioned within the layout. Flow builder 202 may provide, for display by computing device 130, a representation of an element of the element type at the designated position within the layout.

Flow builder 202 can generate a layout including a visual representation that represents the flow in the form of a plurality of interconnected nodes. A node can correspond to an element of the flow, where the element is associated with a set of computer-readable instructions. In some instances, a node can represent data or a data source. The visual representation of the flow may be provided for display via computing device 130, enabling the layout to be easily modified using drag-and-drop operations. As a user interacts with flow builder 202, a layout may be updated in real-time and provided for display via computing device 130, enabling the flow to be easily modified using click-based or drag-and-drop operations.

In some implementations, the layout is an ETL graph representing an ETL flow. By clicking on various nodes in the ETL graph, a user can request previews of output generated at various points during execution of the ETL flow.

In accordance with various implementations, flow builder 202 is configured to facilitate the building of interactive previews responsive to user preview requests. To reduce the amount of processing resources consumed, flow builder 202 is configured to store output of execution of the process flow up to an endpoint defined by a user-selected node within the graph. For example, flow builder 202 can cache output of execution in association with a user-selected subgraph, where an end node (i.e., sink node) of the subgraph is the user-selected node. Flow builder 202 is configured to query a cache to identify cache entries for which subgraphs are equivalent to or a portion of a user-selected graph/subgraph. Flow builder can apply output stored in these identified cache entries to avoid re-execution of portions of the process flow.

In some implementations, flow builder 202 is configured to automatically cache output results associated with intermediate nodes of the user-selected subgraph. More particularly flow builder 202 can identify intermediate nodes for which to cache output results based upon various heuristics. For the identified intermediate nodes, flow builder 202 can cache output results in association with pertinent portion(s) of the user-selected subgraph.

A process flow may be stored in flow library 204. Each flow may be identified by a corresponding flow identifier. A flow may be stored in the form of a file that includes computer-readable instructions.

In some implementations, an element of a particular type may be associated with a corresponding a set of computer-readable instructions that is executed during execution of a flow including the element. For example, an element may call an application programming interface (API) during execution of the flow. In some instances, an element may call an API that accesses an application or service that is external to the system.

In some implementations, generation or updating of a process flow and/or generation of interactive previews is facilitated through an object-oriented system. An element may correspond to an object that is generated via instantiating a class (or subclass), which may correspond to the type of element or its parent (or base) type.

Flow engine 208 may manage execution of flows. More particularly, a user may request execution of a process flow via computing device 126 or, alternatively, another individual or process can request execution of the process flow. In some implementations, a process flow may be executed automatically responsive to a trigger condition or an API call by another system process. Flow engine 208 can access a profile of the user from user profiles 210 to determine whether the user is authorized to execute the flow. Upon determining that the user is authorized to execute the flow, flow engine 208 may execute the flow.

During execution of the process flow, flow engine 208 may execute computer-readable instructions corresponding to elements of the flow. In some instances, the order in which elements of the flow are traversed is determined, at least in part, on user selections during execution of the flow or other conditions that may occur during execution of the process flow.

Database records such as CRM records 212 may be accessed during execution of a process flow. Access of a database record can include, for example, the performance of a create, write, update, query, read, or delete database operation on the database record. Access of a database record may result in the updating of the database record or an independent log file.

During execution of the flow, the flow can provide data for presentation via a client device 126 and/or receive data submitted via client device 126. For example, data can be submitted and/or presented via client device 126 in relation to a screen element of the flow. In addition, data generated by the flow can be provided for presentation via client device 126 upon completion of execution of the flow or portion thereof.

Flow builder 202 may be implemented in a variety of contexts. For example, flow builder 202 may be accessed by a software designer or engineer tasked with designing a software program or system. As another example, flow builder 202 may be accessed by an administrator or other individual to design a learning course via an online e-Learning system.

A process flow can include an element that corresponds to a transaction. A transaction includes a sequence of operations that is treated as a single unit. The sequence of operations typically includes one or more database operations. A database operation may be an operation configurable to store, modify, retrieve, delete, and/or otherwise update or process data in a database. For example, a database operation can include a write operation, an insert operation, an update operation, a read operation, a delete operation, or a select (or query) operation.

Figure 3A:
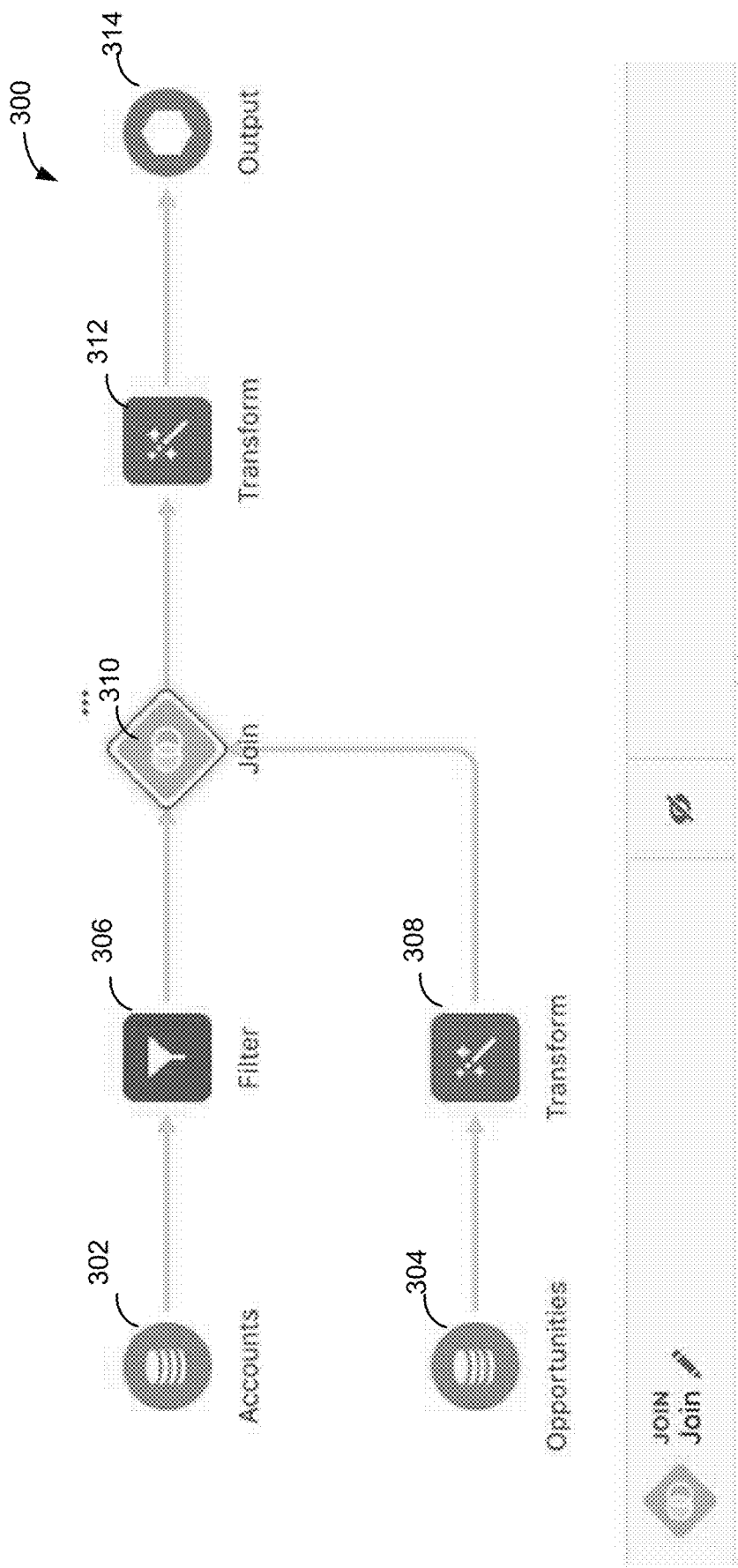
FIG. 3A shows a diagram illustrating an example of a graph 300 representing a process flow, in accordance with some implementations.

FIG. 3A shows a diagram illustrating an example of a graph 300 representing a process flow, in accordance with some implementations. Graph 300 includes a plurality of interconnected nodes representing a process flow. Each node is represented by a corresponding representation (e.g., icon). In this example, nodes 302 and 304 represent data or data sources from which data is retrieved during execution of the process flow. More particularly, node 302 represents Accounts and node 304 represents Opportunities.

Nodes 306-314 represent elements of the process flow, where an element represents a set of computer-readable instructions that can be executed during execution of the process flow or portion thereof. Specifically, node 306 represents a filter operation, node 308 represents a transform operation, node 310 represents a join operation, node 312 represents a transform operation, and node 314 represents an output (e.g., display) operation.

Graph 300 is a directed graph. Arrows shown in graph 300 indicate a direction in which computer-readable instructions corresponding to the elements are to be executed.

As shown in FIG. 3A, the user has selected node 310 by clicking on the icon representing the join operation. Specifically, a selected node can be identified within the graph via a designator such as an outline surrounding the icon. By selecting node 310, the user can request a preview of a corresponding subgraph of graph 300, where the final or "sink" node of the subgraph is the selected node 310. In this manner, the user can request a preview for a specific subgraph of graph 300, where the preview includes results of execution of a corresponding portion of the process flow.

In response to the request, the system builds the requested preview. An example method of building an interactive preview will be described in further detail below with reference to FIG. 4A.

Figure 3B:
FIG. 3B shows a diagram illustrating an example preview 350 of a subgraph of a graph representing a process flow, in accordance with some implementations.

FIG. 3B shows a diagram illustrating an example preview 350 of a subgraph of a graph representing a process flow, in accordance with some implementations. In this example, the preview presents output of the execution of a portion of the process flow, where the portion corresponds to the user-selected subgraph having a final node 310 representing a join operation. The output can be presented in the form of a graph, table, or other suitable data format.

In the example shown in FIG. 3B, the output is presented in the form of a table. For example, columns of the table can correspond to fields of a database while rows of the table can present values of the fields for a plurality of database records.

Figure 4A:
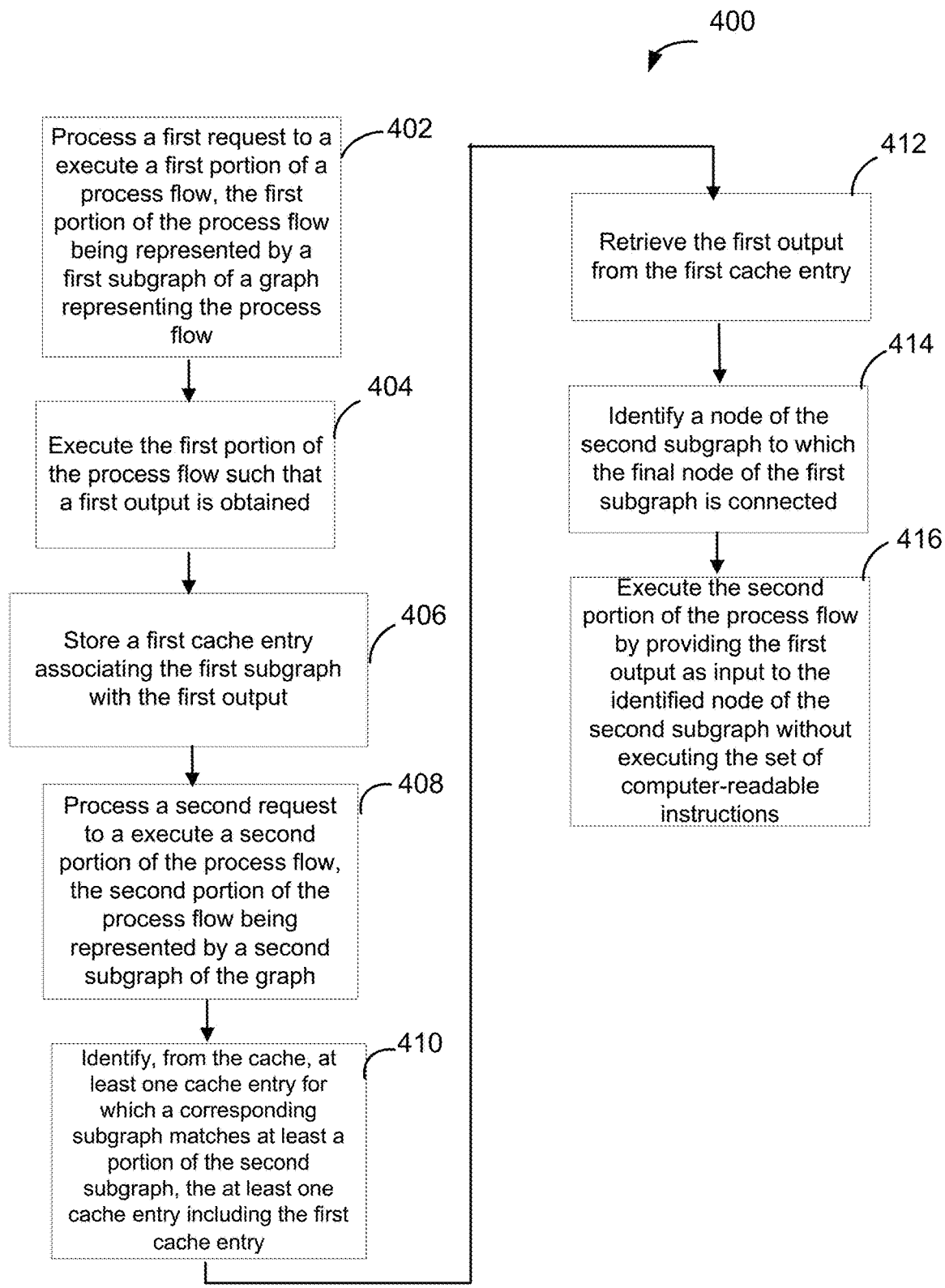
FIG. 4A shows a process flow diagram illustrating a method of building interactive previews, in accordance with various implementations.

FIG. 4A shows a process flow diagram illustrating a method of building interactive previews, in accordance with various implementations. The system processes a first request to execute a first portion of a process flow at 402, where the first request is received from a client device. The first portion of the process flow is represented by a first subgraph of a graph representing the process flow. As described herein, the first request can include a user-selection of a final node of the first subgraph.

The first subgraph can include one or more nodes. Where the first subgraph includes multiple nodes, the nodes of the first subgraph can be interconnected by one or more connectors. One or more nodes including the final node of the first subgraph can correspond to a set of computer-readable instructions.

A graph or subgraph can be stored in a data structure such as a tree data structure. In some implementations, the tree data structure is implemented via one or more linked lists. Information associated with a node of the graph can be stored in a data object.

Assuming that results of execution of the first portion of the process flow or a portion thereof have not been cached, the system executes the first portion of the process flow at 404 such that a first output of executing the first portion of the process flow is obtained. During the initial execution of the first portion of the process flow, the set of computer-readable instructions is executed.

The system stores the first output in association with the first subgraph. More particularly, the system stores, in a cache, a first cache entry associating the first subgraph with the first output at 406.

In some implementations, intermediate results of execution of the first portion of the process flow can be cached for at least one intermediate node of the first subgraph for which the user preview request has been received. More particularly, intermediate results of the execution of a subgraph of the first subgraph may be cached in association with the corresponding portion of the first subgraph, where the subgraph of the first subgraph has a final node defined by the intermediate node and the first subgraph includes at least one node not included in the subgraph.

In some implementations, the system can select the intermediate node(s) of the first subgraph for which to cache intermediate results of execution. For example, the selection may be performed during execution of the first portion of the process flow. In other implementations, the system can identify intermediate node(s) of the graph prior processing the first request.

Various heuristics can be implemented to identify one or more intermediate nodes of the first subgraph for which to cache intermediate results. In some implementations, the system identifies intermediate node(s) having at least a threshold number of input paths and/or at least a threshold number of output paths. The threshold number may be predefined, for example, via a static variable. The pertinent threshold applied to input paths may be the same as or differ from that applied to output paths.

Nodes associated with elements of specific element types may be more likely to have a greater number of input paths and/or output paths. For example, an element such as a join element or append element is likely to have a greater number of input paths, while a node having multiple targets is likely to have a greater number of output paths. Thus, in some implementations, the system may identify specific element type(s) (e.g., join, append) for which intermediate results are to be cached. Intermediate node(s) for which intermediate results are to be cached can be flagged via metadata stored in association with the corresponding first subgraph or graph.

An element of a particular element type may be represented by a corresponding representation (e.g., icon) within the graph (or subgraph thereof). For example, the representation can have a specific name, shape, and/or color.

The system subsequently processes a second request to execute a second portion of the process flow at 408, wherein the second request is received from the client device. The second portion of the process flow is represented by a second subgraph of the graph.

First, the system identifies subgraphs that are contained within the second subgraph and for which output results have been cached. In other words, the system can determine if any cache entries are relevant to the current request. Specifically, the system can determine if any of the subgraphs associated with the cache entries are subgraphs of (e.g., contained within) the second subgraph. By iterating over cache entries rather than checking each subgraph of the graph, the cache can be processed in an efficient manner.

In some implementations, the system processes cached subgraphs of cache entries to identify those that match portions of the second subgraph. For a given cache entry, the system simultaneously traverses the cached subgraph and the second subgraph. More particularly, the system determines the last node (e.g., sink node) of a cached subgraph. The system may then compare the last node of the cached subgraph with the last node of the second subgraph that has been selected by the user. Such a comparison can include, for example, comparing a name/identifier of a node or corresponding method. In addition, the comparison can include comparing name(s) of field(s) or parameters of an input node or corresponding method. As the system traverses backwards along both graphs, the system can iteratively compare prior node(s) of the cached subgraph with prior node(s) of the second subgraph. This reverse traversal of both subgraphs may be performed via execution of a recursive process. In this manner, pairs of nodes of both subgraphs can be compared while simultaneously traversing both subgraphs.

If all nodes of a cached subgraph are determined to be identical or equivalent to corresponding nodes of at least a portion of the second subgraph, the cached subgraph is determined to be contained within the second subgraph. The first subgraph need not contain all nodes within the second subgraph to be considered to be identical or equivalent to a portion of the second subgraph. However, in some instances, the first subgraph may be identical to the second subgraph.

The system identifies, from the cache, at least one cache entry for which a corresponding subgraph matches at least a portion of the second subgraph at 410. For example, the at least one cache entry may include the first cache entry. In other words the first subgraph may be the same as or equivalent to at least a portion of the second subgraph.

Second, the system determines a way to "stitch" together the relevant cached output results with remaining portions of the second subgraph to generate output results that would be obtained as a result of executing the second subgraph. In other words, the system identifies portions of the second subgraph for which execution can be skipped.

The system retrieves the first output from the first cache entry at 412 and identifies an input node of the second subgraph to which the final node of the first subgraph is connected at 414. This enables cached output results to be provided to the identified input node.

The second portion of the process flow may be executed by providing the first output as input to the identified node of the second subgraph at 416. Thus, an output of executing the second portion of the process flow is obtained without executing the set of computer-readable instructions associated with the final node of the first subgraph.

Executing a process flow using cached subgraphs enables execution to be performed in an efficient manner while minimizing the processing resources that are consumed. As a result, the second portion of the process flow can be executed without executing computer-readable instructions of the first portion of the process flow.

Figure 4B:
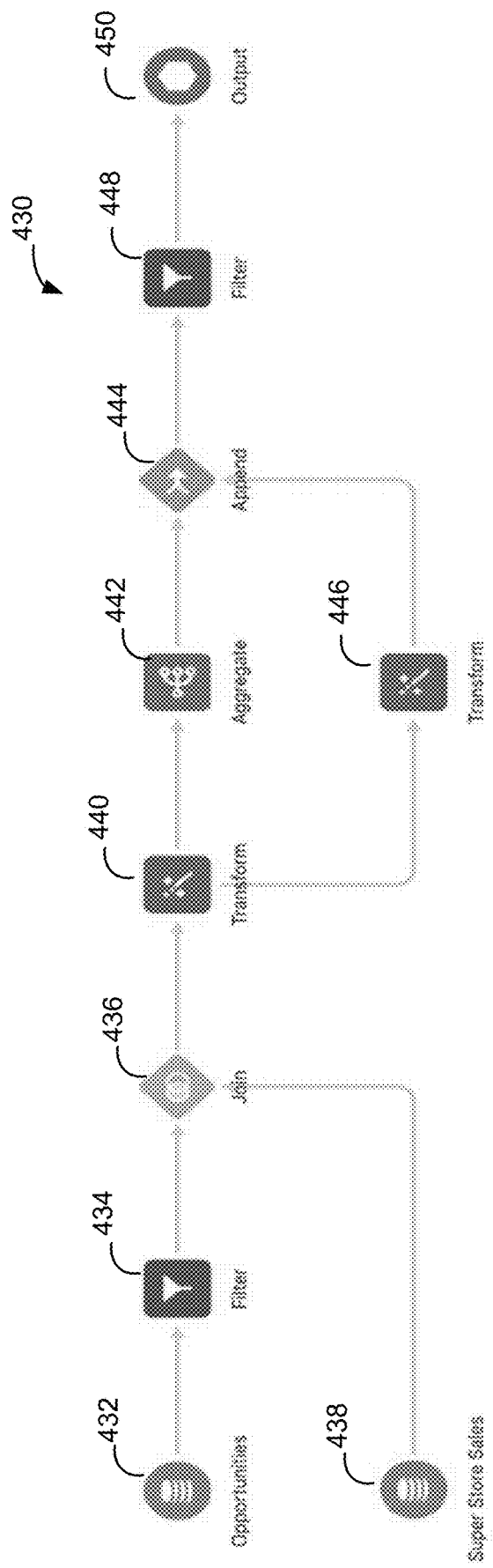
FIG. 4B shows an example of a graph 430 for which a preview has been requested, in accordance with some implementations.

To illustrate the automated process of intermediate node selection and caching of intermediate results, an example of a graph 430 for which a preview has been requested is shown in FIG. 4B. In this example, during execution of a process flow represented by graph 430, data is extracted from data source 432 and filtered by filter node 434, which provides filtered output to a first input of join node 436. In addition, data is extracted from data source 438 and provided to a second input of join node 436. Join node 436 performs a join operation on both data inputs. The output of join node 436 is transformed by transform node 440, which provides transformed data to aggregate node 442 and transform node 446. The output of aggregate node 442 and transform node 446 are provided as inputs to append node 444. The output of append node 444 is provided to filter node 448, and filtered results generated by filter node 448 are provided to output node 450.

Assuming that the user has selected a preview node such as filter node 448, the system executes the process flow up to the selected preview node, filter node 448, and stores output results in association with a subgraph ending with filter node 448. In addition, the system may identify intermediate nodes for which intermediate results are cached in association with corresponding subgraphs, as will be described in further detail below with reference to FIG. 4C.

Figure 4C:
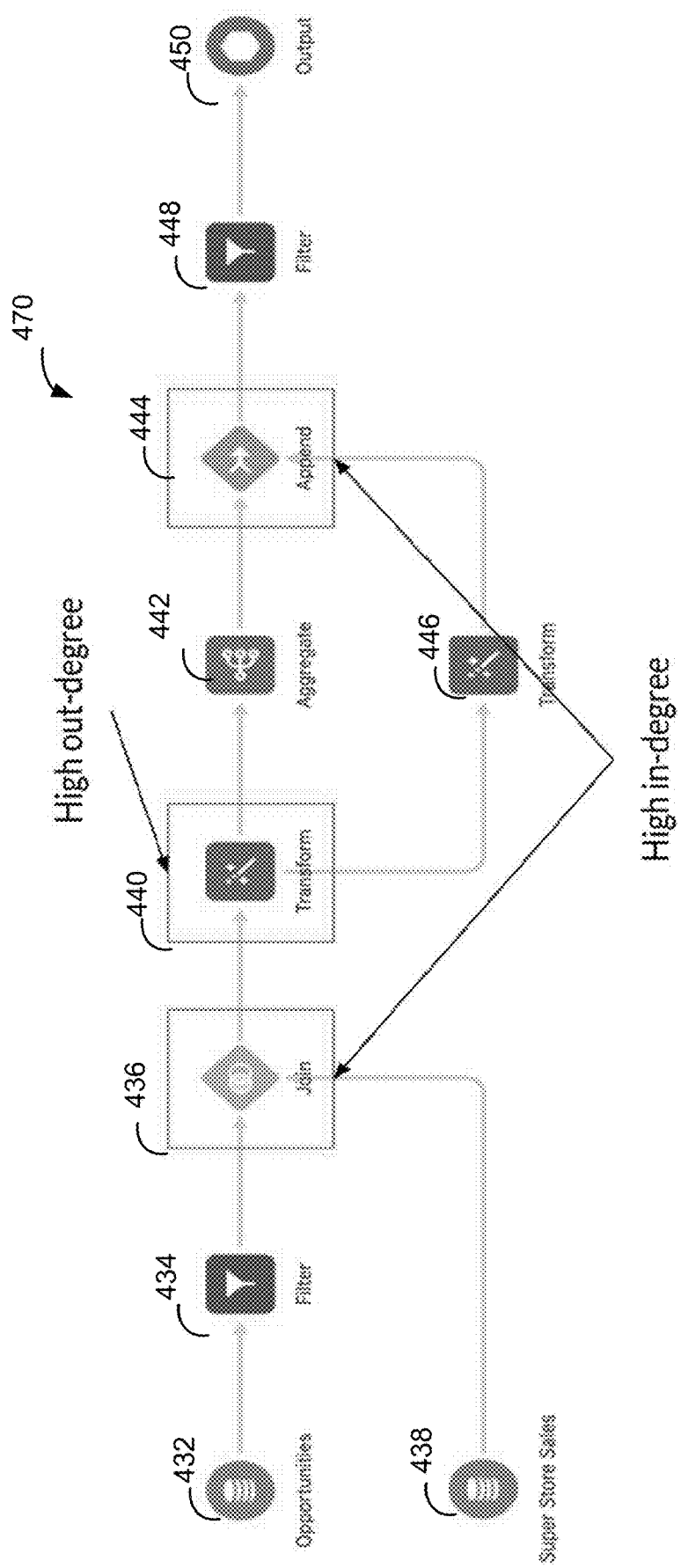
FIG. 4C shows an example of intermediate node selection and intermediate result caching performed with respect to graph 430 of FIG. 4B.

FIG. 4C shows an example of a graph 470 representing intermediate node selection and caching of intermediate results with respect to graph 430 of FIG. 4B. Specifically, the system ascertains whether there are intermediate node(s) between initial node(s) (e.g., data sources 432, 438) and the preview node selected by the user for which intermediate caching is to be performed. In some implementations, the system can identify intermediate nodes that have a high degree of input paths. This may be accomplished, for example, by identifying intermediate nodes of a first category of node types (e.g., join node or append node) and/or identifying intermediate nodes for which the number of input paths is greater than a predefined threshold (e.g., 1). Similarly, the system can also identify intermediate nodes that have a high degree of output paths. This may be accomplished, for example, by identifying intermediate nodes of a second category of node types (e.g., transform node) and/or identifying intermediate nodes for which the number output paths is greater than a predefined threshold (e.g., 1).

In the example shown in FIG. 4C, the system has identified join node 436 and append node 444 as having a high degree of input nodes and transform node 440 as having a high degree of output nodes. Therefore, the system selects nodes 436, 444, and 440 as intermediate nodes for which intermediate results are cached.

Responsive to the preview request received from a user in association with the preview node, system caches execution results for the preview node. In addition, the system caches intermediate results for nodes 436, 444, 440 in association with corresponding subgraphs ending with respective intermediate nodes 436, 444, 440. Thus, in this example, the system creates four cache entries responsive to the user's preview request. Once cached, cache entries are available to serve subsequent preview requests.

For example, if the user subsequently submits another preview request by clicking on append node 444, the system interprets this is a request to execute a portion of the process flow represented by a second subgraph ending with append node 444. The system identifies a cache entry for which a subgraph matches at least a portion of the second subgraph (e.g., where the cache entry associates the subgraph ending with append node 444 and intermediate results obtained at append node 444), retrieves the intermediate results cached in association with the subgraph ending with append node 444, and provides the intermediate results without executing the computer-readable instructions of the pertinent portion of the flow.

As another example, if the user subsequently submits another preview request by clicking on aggregate node 442, the system interprets this as a request to execute a portion of the process flow represented by a second subgraph ending with aggregate node 442. The system identifies a cache entry for which a subgraph matches at least a portion of the second subgraph (e.g., where the cache entry associates the subgraph ending with transform node 440 and intermediate results obtained at transform node 440), retrieves the intermediate results cached in association with the subgraph ending with transform node 440, identifies an input node of the second subgraph to which transform node 440 is connected (e.g. aggregate node 442), and provide the provides the intermediate results as input to aggregate node 442, enabling output of aggregate node 442 to be obtained without re-executing computer-readable instructions corresponding to the subgraph ending with transform node 440.

While it is possible that execution of the entire first portion of the process flow represented by a cached subgraph can be skipped, this is not necessarily the case in all instances. The complexities of application of the disclosed implementations are illustrated in the examples below.

Figure 5A:
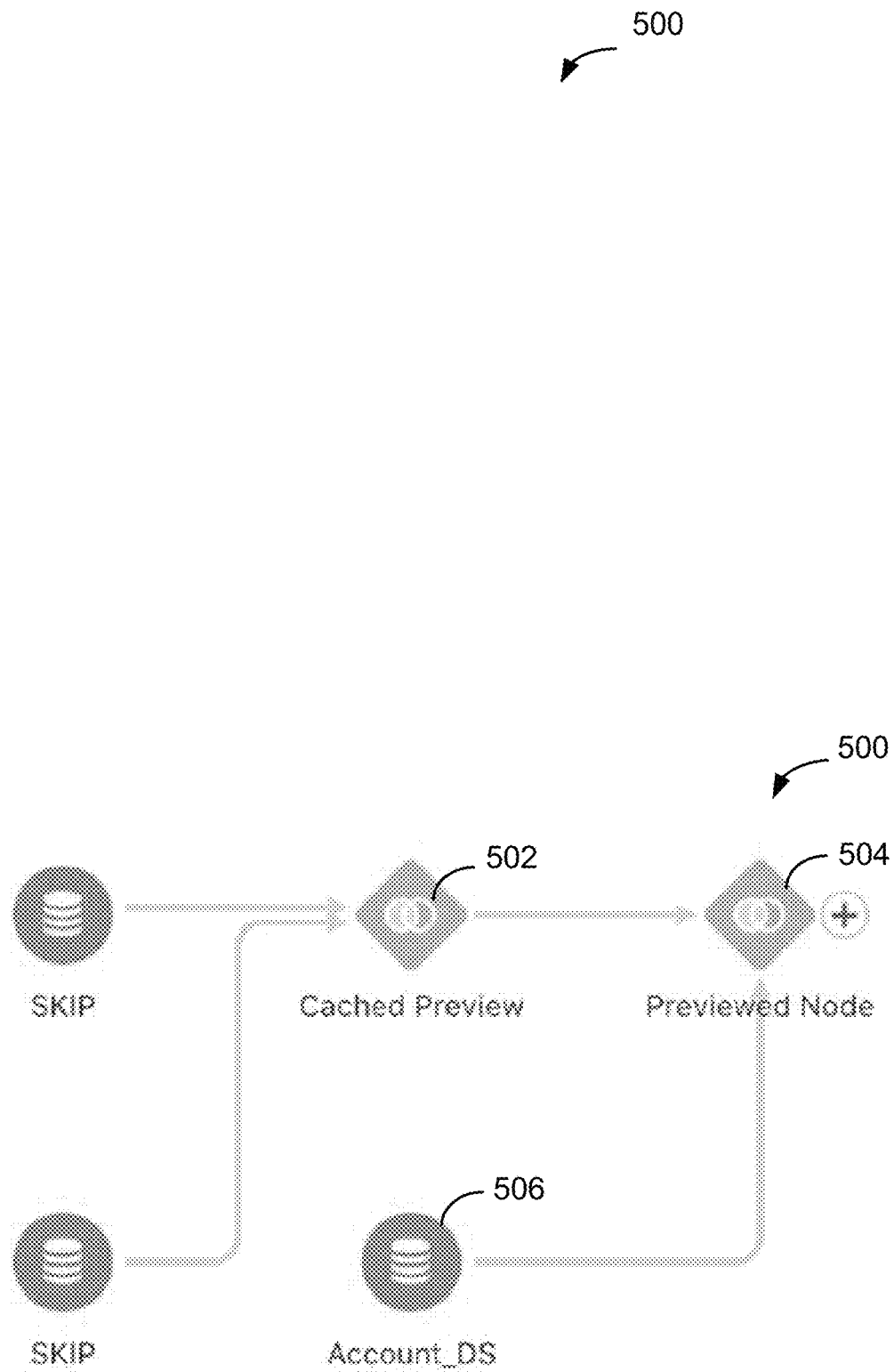
FIGS. 5A-5F show examples of graphs for which previews have been requested, in accordance with some implementations.

FIGS. 5A-5F show examples of graphs for which previews have been requested, in accordance with some implementations. FIG. 5A shows a graph 500 for which a cache entry identifies a cached subgraph that has a final node, join node 502. In this case, the computer-readable instructions of the entire cached subgraph can be skipped during execution of graph 500. The cached output results can be obtained from the cache entry and provided to preview node 504 (selected by the user), which extracts data from source node 506 during execution.

Figure 5B:
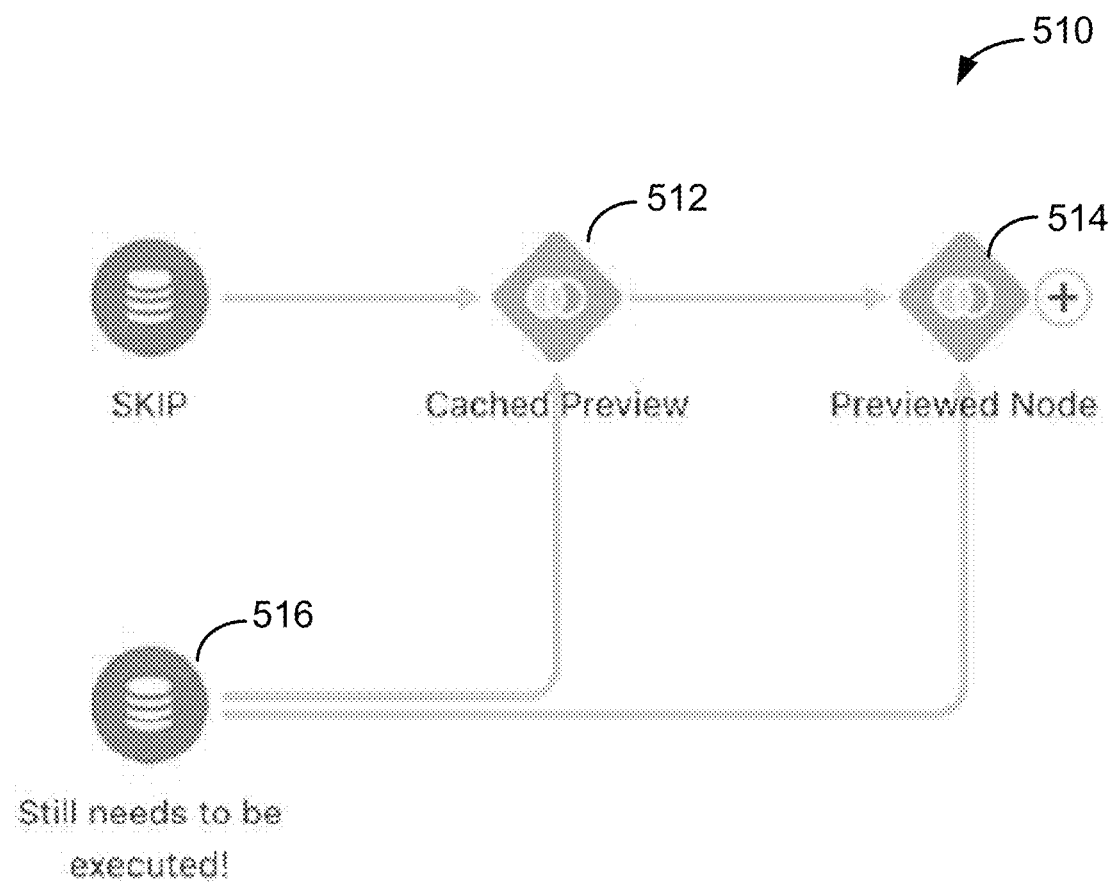

FIG. 5B shows a graph 510 for which a cache entry identifies a cached subgraph that has a final node, join node 512. In this instance, cached output results can be obtained from the cache entry and provided to preview node 514 (selected by the user). However, since node 514 extracts data from data source 516 of the cached subgraph, extraction of data from source node 516 of the cached subgraph cannot be skipped. Thus, while execution of computer-readable instructions of the final node of the cached subgraph can be skipped, other nodes within the cached subgraph may not always be skipped in all instances.

Figure 5C:
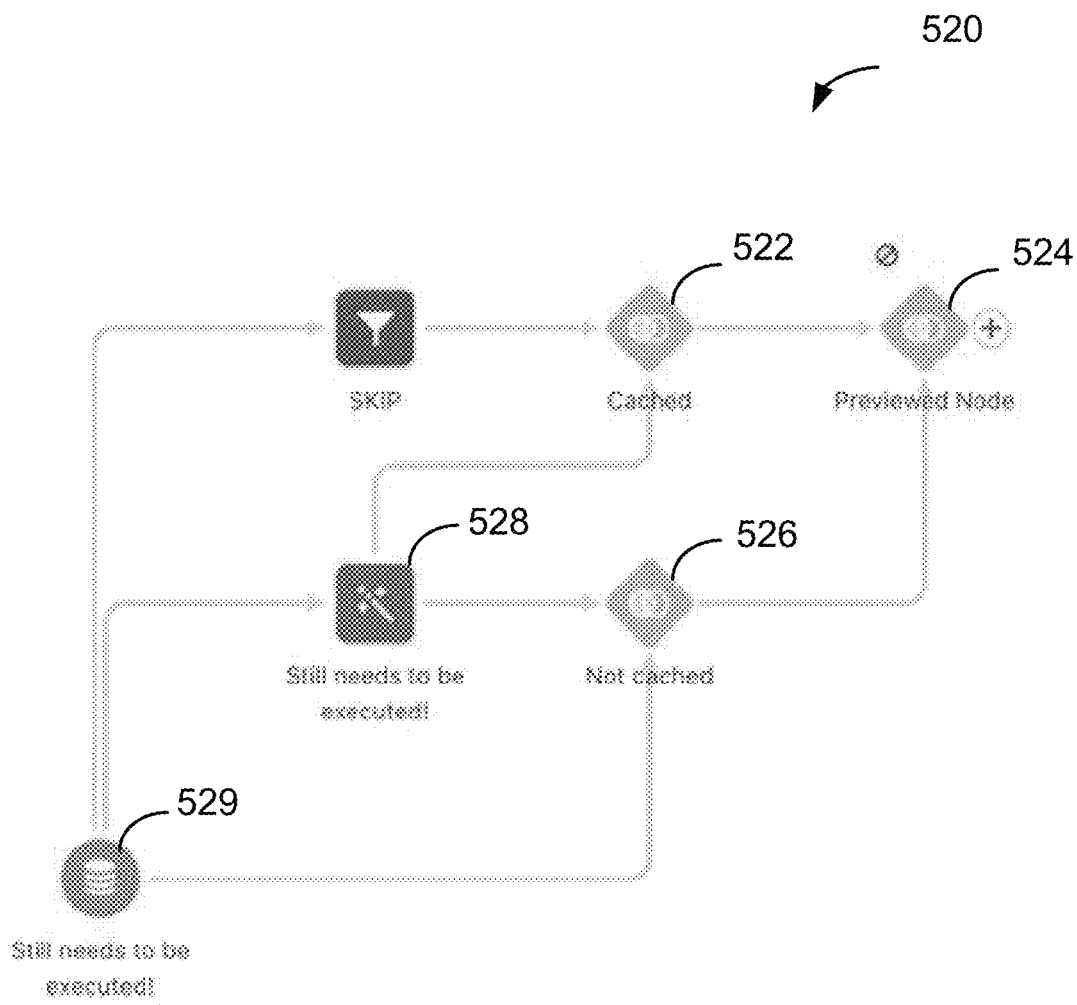

FIG. 5C shows a graph 520 for which a cache entry identifies a cached subgraph that has a final node, join node 522. Cached output results can be obtained from the cache entry and provided to preview node 524 (selected by the user). However, since join node 526 is not cached, join node 526 and transform node 528 remain to be executed. As shown in this example, nodes 526 and 528 both extract data from source node 529. Therefore, nodes 528 and 529 cannot be skipped during execution for the requested preview, even though they are part of the cached subgraph.

Figure 5D:
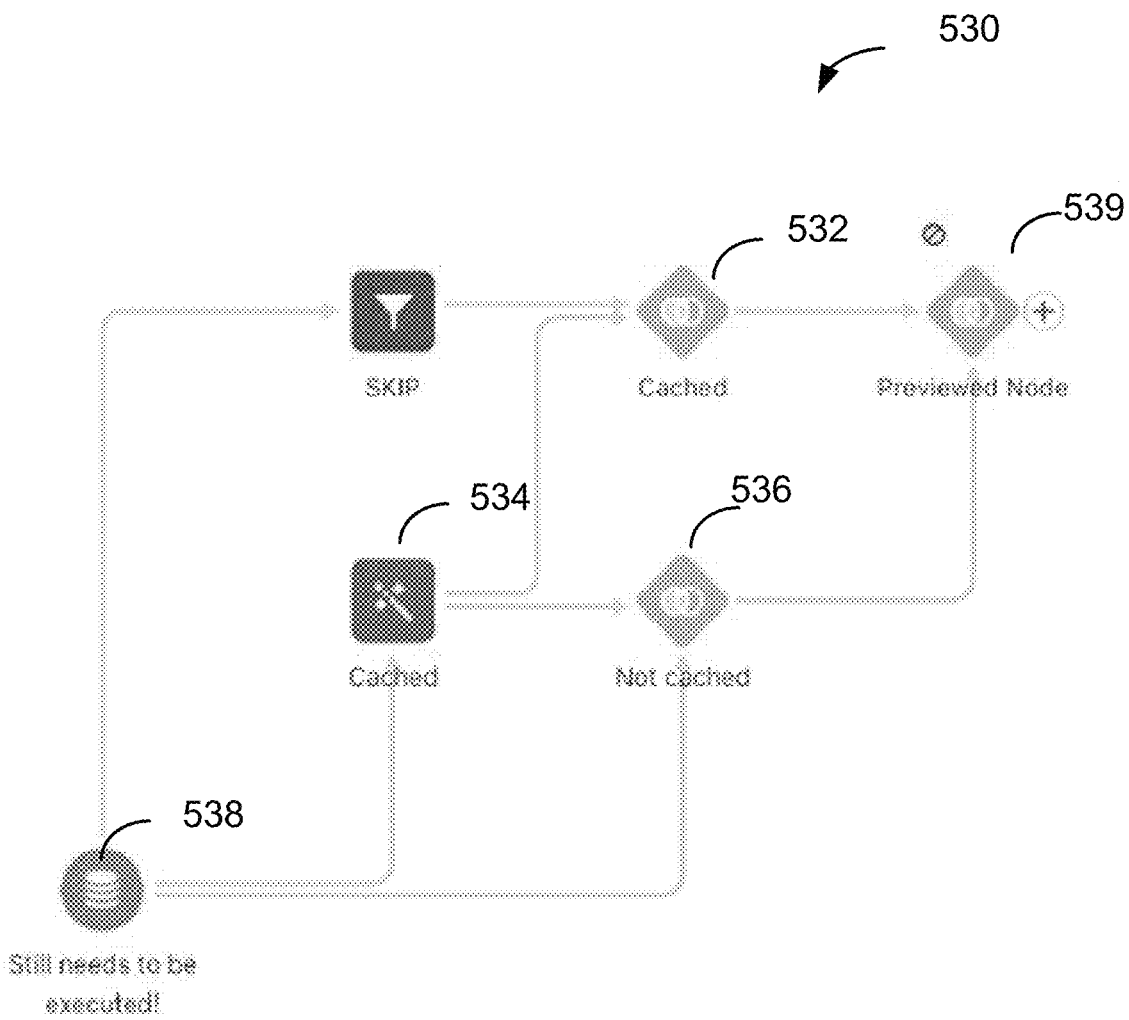

FIG. 5D shows a graph 530 for which a cache entry identifies a cached subgraph that has a final node, join node 532. Cached output results can be obtained from a first cache entry and provided to preview node 539 (selected by the user). In addition, a subgraph of the cached subgraph is also separately cached and has a final node, transform node 534. Since join node 536 is not cached, cached output results associated with the separately cached subgraph corresponding to transform node 534 are obtained from a second cache entry and provided as an input to join node 536. In addition, join node 536 extracts data from source node 538 and output results of join node 536 are provided as a second input to preview node 539. As shown in this example, even though join node 532 is cached, its subgraph's cached results are not irrelevant. Therefore, execution cannot be skipped for node 538 of the cached subgraph and join nodes 538, 539 are executed to generate the requested preview.

Figure 5E:
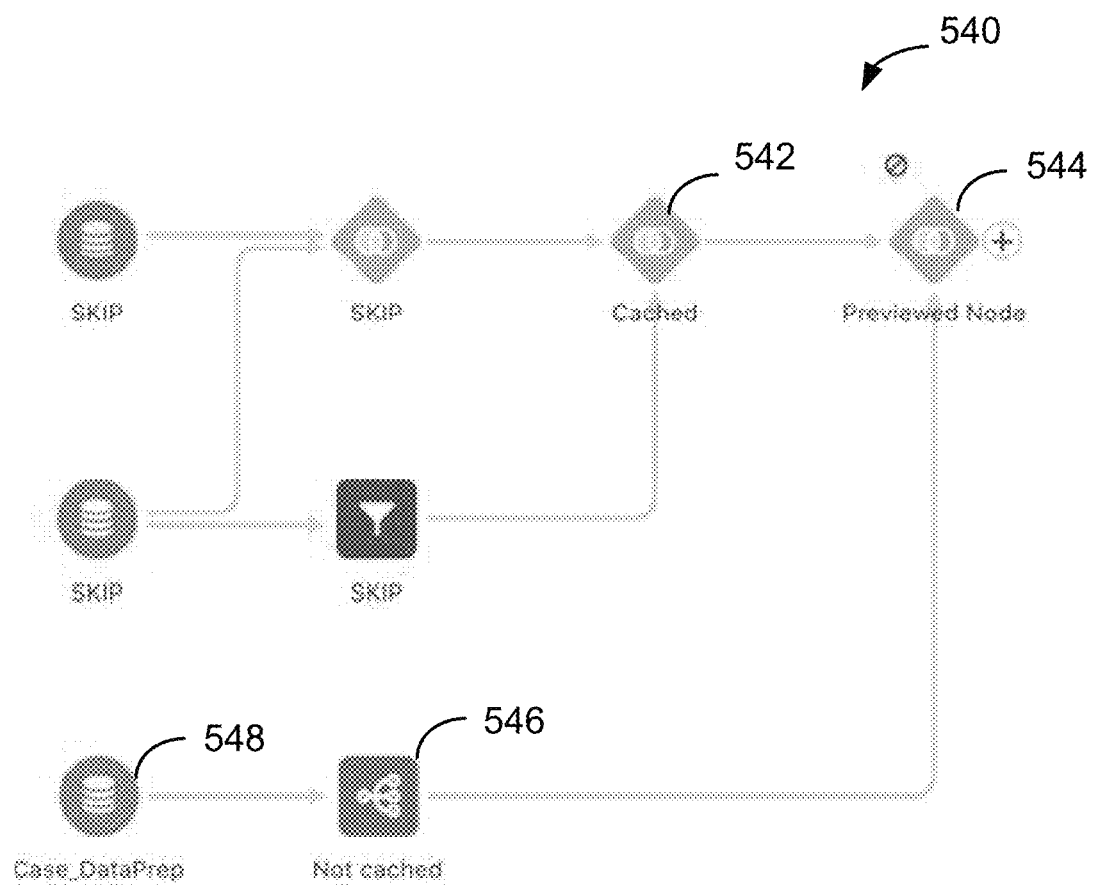

FIG. 5E shows a graph 540 for which a cache entry identifies a cached subgraph that has a final node, join node 542. In this case, the computer-readable instructions of the entire cached subgraph can be skipped during execution of graph 540. The cached output results can be obtained from the cache entry and provided to preview node 544 (selected by the user). Since output results associated with transform node 546 have not been cached, transform node 546, node 548, and 544 execute to generate preview results.

Figure 5F:
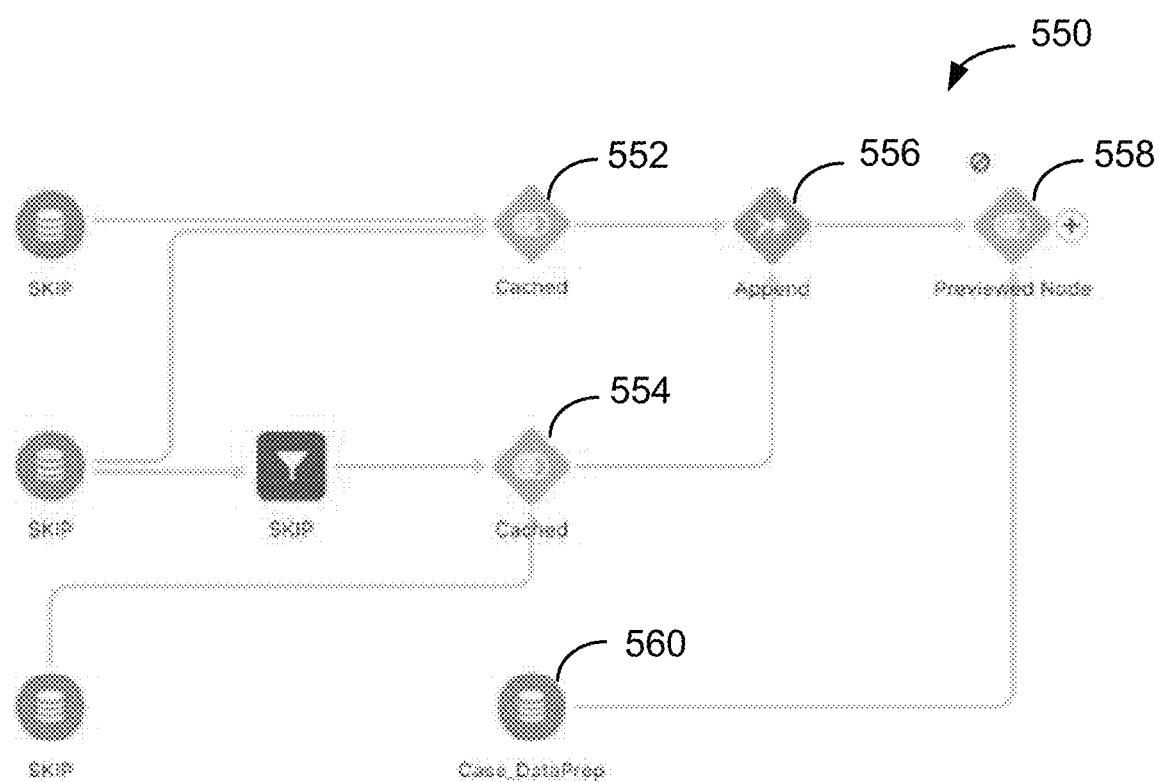

FIG. 5F shows a graph 550 for which a first cache entry identifies a first cached subgraph having a final node, join node 552 and a second cache entry identifies a second cached subgraph having a final node, join node 554. Cached output results are obtained from both cache entries and provided as input to join node 556, enabling execution of both subgraphs to be skipped. Results of execution of join node 556 are provided to preview node 558. Preview node 558 executes using input from join node 556 and data obtained from node 560. Therefore, branching need not terminate within a single cached subgraph for nodes to be skipped.

Through the use of cached subgraphs, it is possible to reduce the number of nodes for which computer-readable instructions are executed for a process flow. By skipping execution for a subgraph for which an execution result is cached, the computational load is greatly reduced. More particularly, where a graph contains n nodes, the computational load is reduced to $O(n)$ previews from $O(n^2)$ previews for the entire graph. Specifically, the time it takes for the system to locate a sink node of a subgraph of a cached entry (i.e., cached subgraph), the time it takes for the system to find a node within the cached subgraph that matches a node of the current subgraph for which a preview is requested, and the time it takes for the system to verify equality of two subgraphs (the cached subgraph and the current subgraph for which the preview is requested) are each of the order of $O(n)$. Therefore, the disclosed implementations provide a number of advantages that cannot be achieved by existing systems.

Some but not all of the techniques described or referenced herein are implemented using or in conjunction with a database system. Salesforce.com, inc, is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
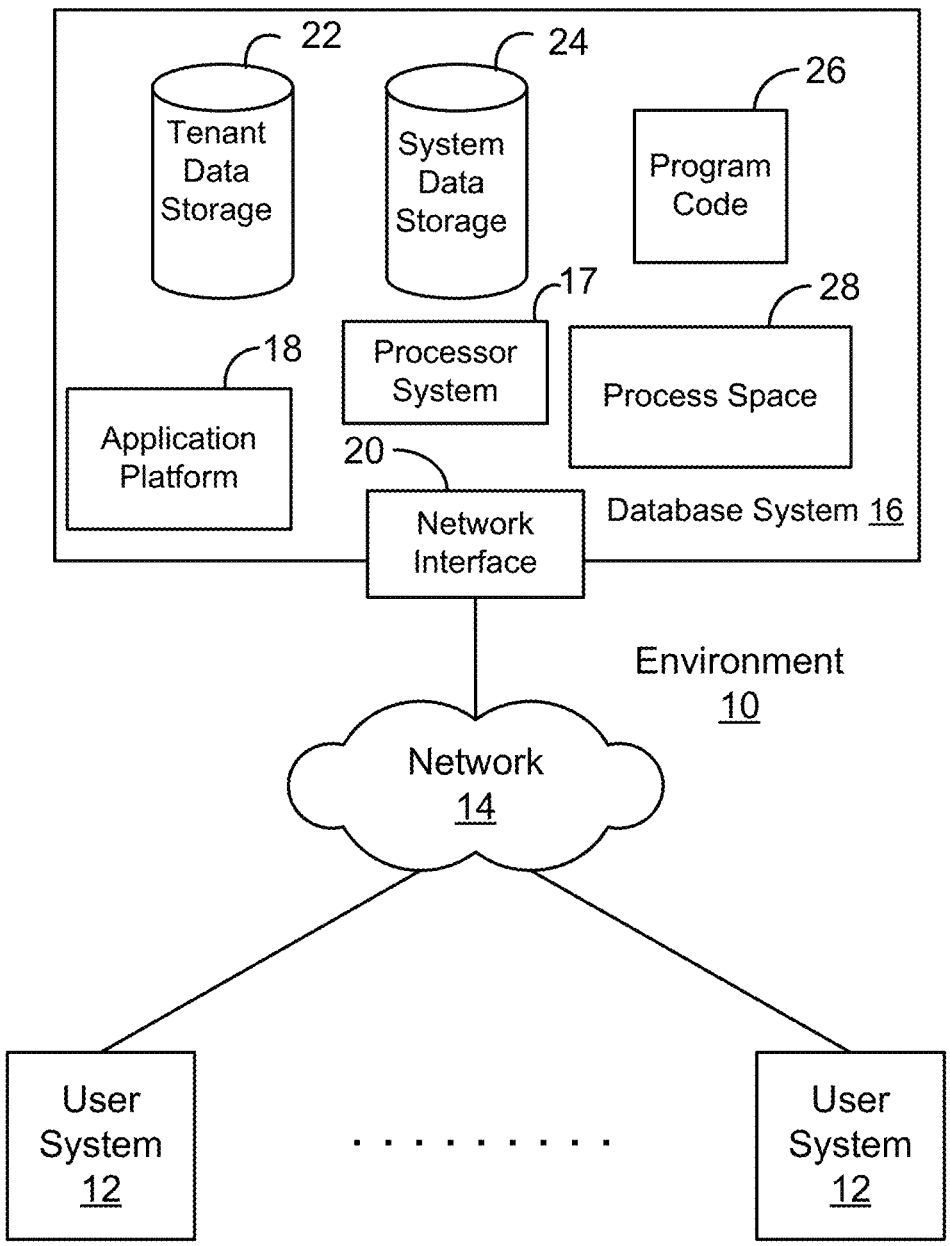
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS. WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7A:
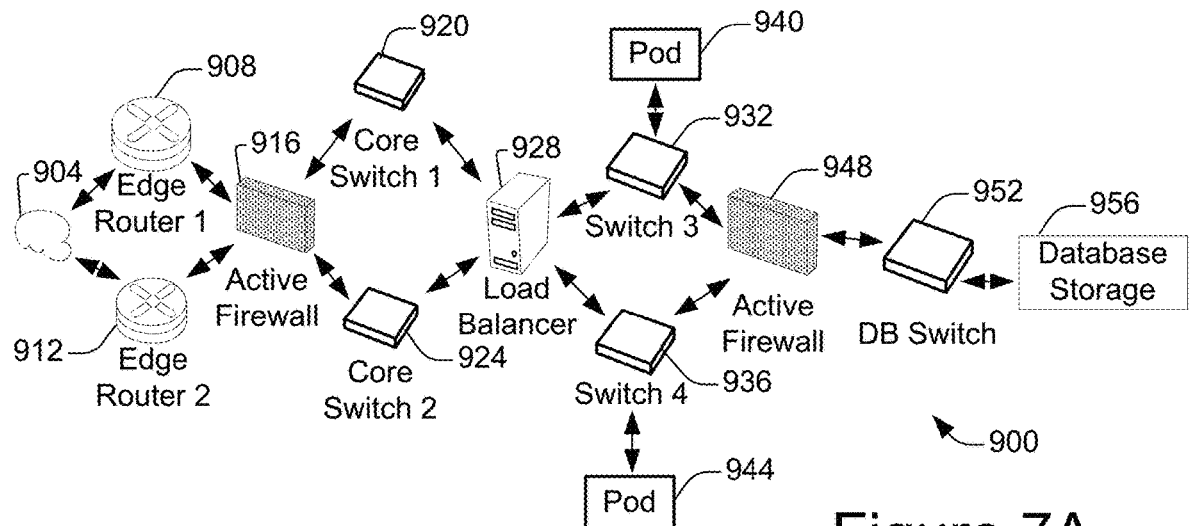
FIG. 7A shows a system diagram of an example of architectural components of an on-demand database service environment 900, in accordance with some implementations.
Figure 7B:
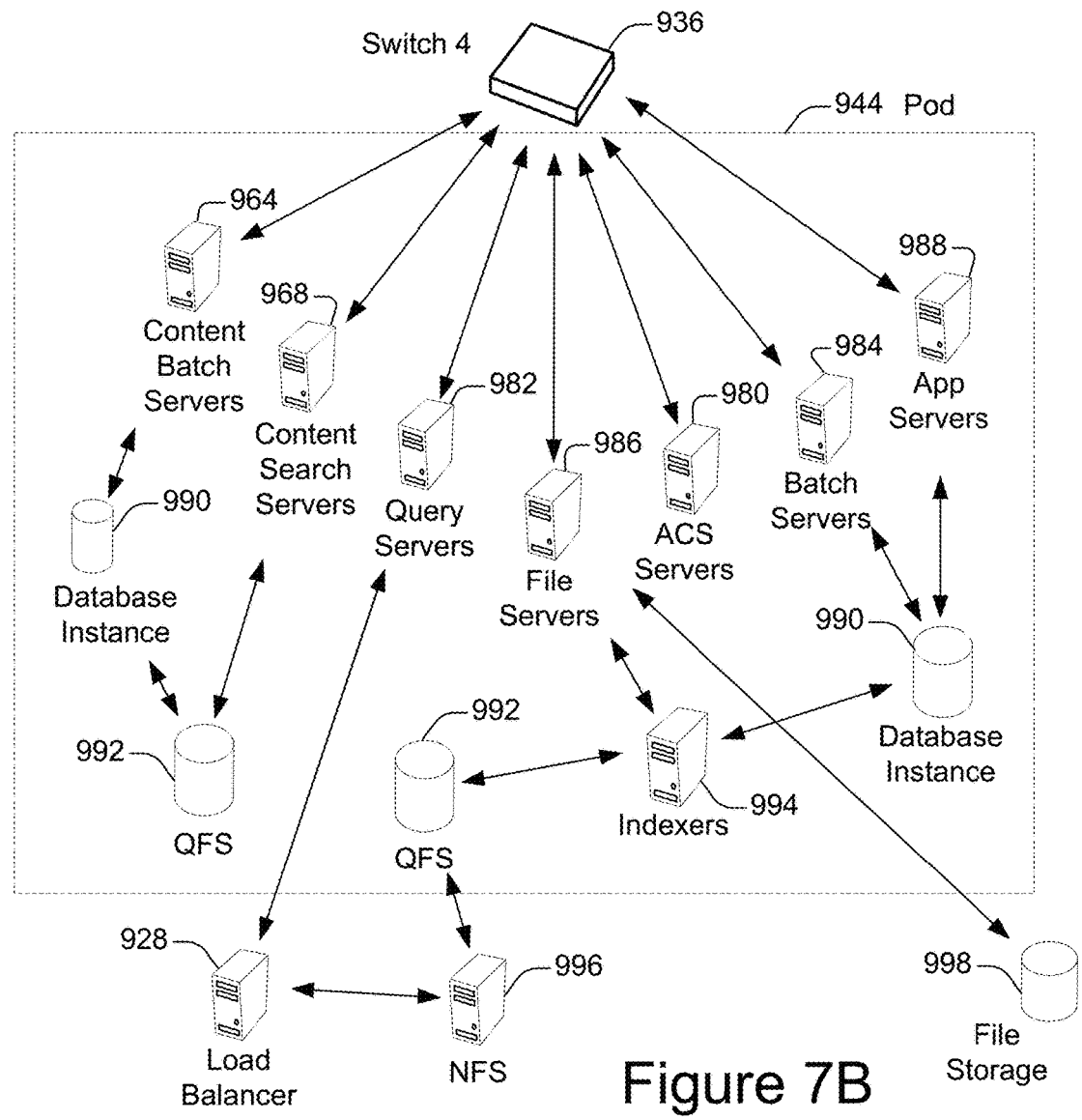
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MIS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
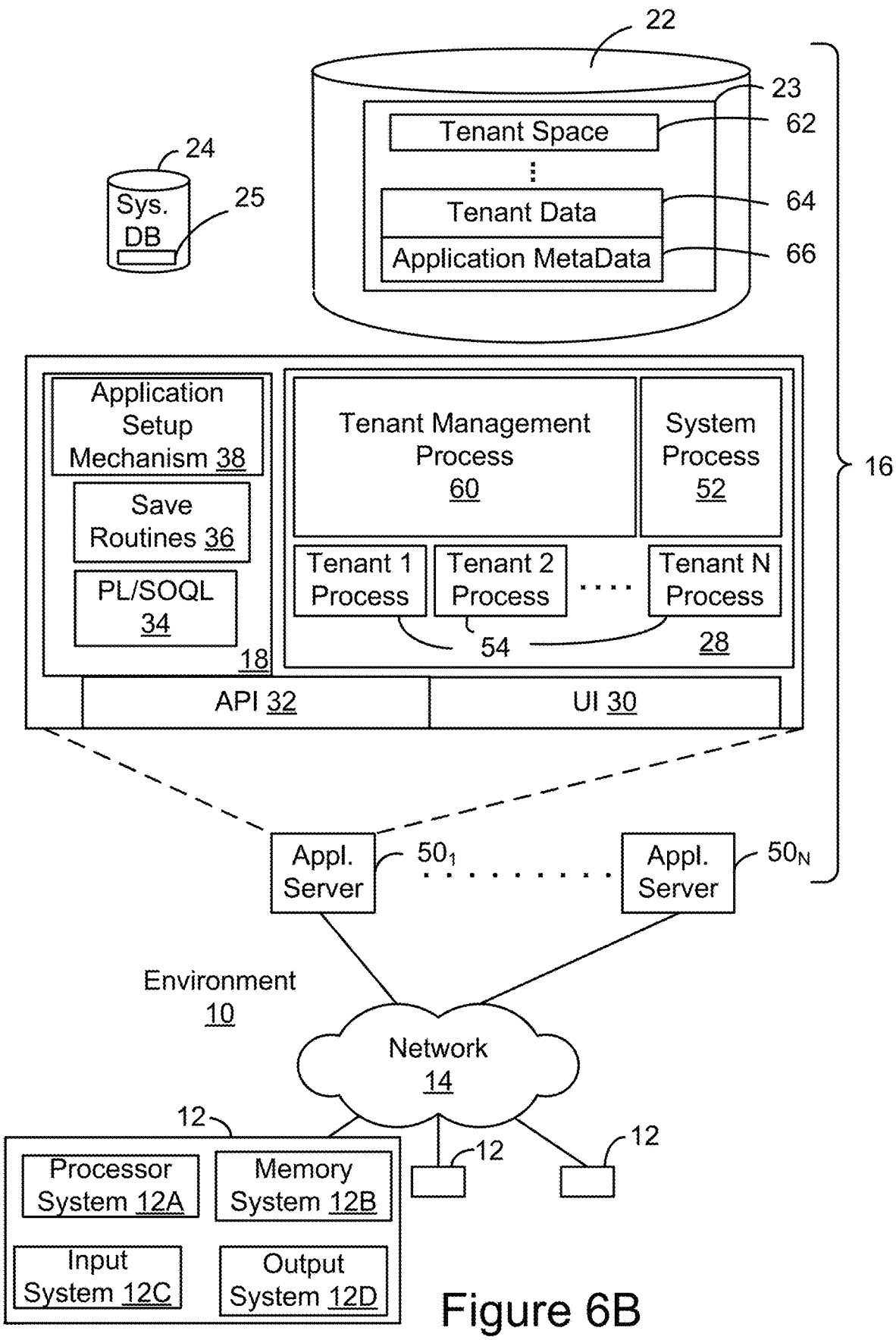
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers. FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include any-where from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system including a processor and memory, the database system being configurable to cause:
processing a first request to execute a first portion of a process flow, the first portion of the process flow being represented by a first subgraph of a graph representing the process flow, a final node of the first subgraph corresponding to a set of computer-readable instructions, the first request being received from a client device;
executing the first portion of the process flow such that a first output of executing the first portion of the process flow is obtained;
storing, in a cache, a first cache entry associating the first subgraph with the first output;
processing a second request to execute a second portion of the process flow, the second portion of the process flow being represented by a second subgraph of the graph, the second request being received from the client device;
identifying, from the cache, at least one cache entry for which a corresponding subgraph matches at least a portion of the second subgraph, the at least one cache entry including the first cache entry;
retrieving the first output from the first cache entry;
identifying a node of the second subgraph to which the final node of the first subgraph is connected; and
executing the second portion of the process flow by providing the first output as input to the identified node of the second subgraph without executing the set of computer-readable instructions.

2. The system of claim 1, the database system further configurable to cause:
for at least the first cache entry, comparing a final node of the first subgraph with a final node of the second subgraph; and
comparing one or more prior nodes of the first subgraph with one or more prior nodes of the second subgraph.

3. The system of claim 2, wherein comparing the final node of the first subgraph with the final node of the second subgraph comprises comparing parameters of the final node of the first subgraph with parameters of the final node of the second subgraph.

4. The system of claim 1, the database system further configurable to cause:
storing, in the cache, a second cache entry associating a subgraph of the first subgraph with an intermediate result of executing the first portion of the process flow, the intermediate result being an output of executing the subgraph of the first subgraph, the first subgraph including at least one node not included in the subgraph.

5. The system of claim 1, the database system further configurable to cause:
selecting at least a first intermediate node of the first subgraph for which an intermediate result of executing the first portion of the process flow is to be stored in the cache, the first intermediate node being associated with a corresponding subgraph of the first subgraph, the first subgraph including at least one node not included in the subgraph.

6. The system of claim 1, the database system further configurable to cause:
determining whether to store in the cache, for an intermediate node of the first subgraph, an intermediate result of executing the first portion of the process flow, the intermediate node being associated with a corresponding subgraph of the first subgraph, the first subgraph including at least one node not included in the subgraph.

7. The system of claim 1, the database system further configurable to cause:
determining whether to store in the cache, for an intermediate node of the first subgraph, an intermediate result of executing the first portion of the process flow based at least in part on at least one of: a quantity of input paths to the intermediate node or a quantity of output paths of the intermediate node, the intermediate node being associated with a corresponding subgraph of the first subgraph, the first subgraph including at least one node not included in the subgraph.

8. A method, comprising:
processing a first request to execute a first portion of a process flow, the first portion of the process flow being represented by a first subgraph of a graph representing the process flow, a final node of the first subgraph corresponding to a set of computer-readable instructions, the first request being received from a client device;
executing the first portion of the process flow such that a first output of executing the first portion of the process flow is obtained;
storing, in a cache, a first cache entry associating the first subgraph with the first output;
processing a second request to execute a second portion of the process flow, the second portion of the process flow being represented by a second subgraph of the graph, the second request being received from the client device;
identifying, from the cache, at least one cache entry for which a corresponding subgraph matches at least a portion of the second subgraph, the at least one cache entry including the first cache entry;
retrieving the first output from the first cache entry;
identifying a node of the second subgraph to which the final node of the first subgraph is connected; and
executing the second portion of the process flow by providing the first output as input to the identified node of the second subgraph without executing the set of computer-readable instructions.

9. The method of claim 8, further comprising:
for at least the first cache entry, comparing a final node of the first subgraph with a final node of the second subgraph; and
comparing one or more prior nodes of the first subgraph with one or more prior nodes of the second subgraph.

10. The method of claim 9, wherein comparing the final node of the first subgraph with the final node of the second subgraph comprises comparing parameters of the final node of the first subgraph with parameters of the final node of the second subgraph.

11. The method of claim 8, further comprising:
storing, in the cache, a second cache entry associating a subgraph of the first subgraph with an intermediate result of executing the first portion of the process flow, the intermediate result being an output of executing the subgraph of the first subgraph, the first subgraph including at least one node not included in the subgraph.

12. The method of claim 8, further comprising:
selecting at least a first intermediate node of the first subgraph for which an intermediate result of executing the first portion of the process flow is to be stored in the cache, the first intermediate node being associated with a corresponding subgraph of the first subgraph, the first subgraph including at least one node not included in the subgraph.

13. The method of claim 8, further comprising:
determining whether to store in the cache, for an intermediate node of the first subgraph, an intermediate result of executing the first portion of the process flow, the intermediate node being associated with a corresponding subgraph of the first subgraph, the first subgraph including at least one node not included in the subgraph.

14. The method of claim 8, further comprising:
determining whether to store in the cache, for an intermediate node of the first subgraph, an intermediate result of executing the first portion of the process flow based at least in part on at least one of: a quantity of input paths to the intermediate node or a quantity of output paths of the intermediate node, the intermediate node being associated with a corresponding subgraph of the first subgraph, the first subgraph including at least one node not included in the subgraph.

15. A computer program product comprising computer-readable program code stored on a non-transitory computer-readable medium, the program code configurable to cause:
processing a first request to execute a first portion of a process flow, the first portion of the process flow being represented by a first subgraph of a graph representing the process flow, a final node of the first subgraph corresponding to a set of computer-readable instructions, the first request being received from a client device;
executing the first portion of the process flow such that a first output of executing the first portion of the process flow is obtained;
storing, in a cache, a first cache entry associating the first subgraph with the first output;
processing a second request to execute a second portion of the process flow, the second portion of the process flow being represented by a second subgraph of the graph, the second request being received from the client device;
identifying, from the cache, at least one cache entry for which a corresponding subgraph matches at least a portion of the second subgraph, the at least one cache entry including the first cache entry;
retrieving the first output from the first cache entry;
identifying a node of the second subgraph to which the final node of the first subgraph is connected; and
executing the second portion of the process flow by providing the first output as input to the identified node of the second subgraph without executing the set of computer-readable instructions.

16. The computer program product of claim 15, the program code further comprising computer-readable instructions configurable to cause:
for at least the first cache entry, comparing a final node of the first subgraph with a final node of the second subgraph; and
comparing one or more prior nodes of the first subgraph with one or more prior nodes of the second subgraph.

17. The computer program product of claim 16, wherein comparing the final node of the first subgraph with the final node of the second subgraph comprises comparing parameters of the final node of the first subgraph with parameters of the final node of the second subgraph.

18. The computer program product of claim 15, the program code further comprising computer-readable instructions configurable to cause:
storing, in the cache, a second cache entry associating a subgraph of the first subgraph with an intermediate result of executing the first portion of the process flow, the intermediate result being an output of executing the subgraph of the first subgraph, the first subgraph including at least one node not included in the subgraph.

19. The computer program product of claim 15, the program code further comprising computer-readable instructions configurable to cause:
selecting at least a first intermediate node of the first subgraph for which an intermediate result of executing the first portion of the process flow is to be stored in the cache, the first intermediate node being associated with a corresponding subgraph of the first subgraph, the first subgraph including at least one node not included in the subgraph.

20. The computer program product of claim 15, the program code further comprising computer-readable instructions configurable to cause:
determining whether to store in the cache, for an intermediate node of the first subgraph, an intermediate result of executing the first portion of the process flow, the intermediate node being associated with a corresponding subgraph of the first subgraph, the first subgraph including at least one node not included in the subgraph.

* * * * *